(12) United States Patent
Nagao et al.

(10) Patent No.: US 9,067,193 B2
(45) Date of Patent: Jun. 30, 2015

(54) EXHAUST GAS PURIFYING CATALYST AND METHOD FOR PRODUCING SAME

(71) Applicant: TOYOTA JIDOSHA KABUSHIKI KAISHA, Toyota-shi (JP)

(72) Inventors: Satoshi Nagao, Gotenba (JP); Rui Imoto, Susono (JP); Daichi Sato, Susono (JP); Yusaku Inatomi, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/343,243

(22) PCT Filed: Dec. 18, 2012

(86) PCT No.: PCT/JP2012/082816
§ 371 (c)(1),
(2) Date: Mar. 6, 2014

(87) PCT Pub. No.: WO2013/099706
PCT Pub. Date: Jul. 4, 2013

(65) Prior Publication Data
US 2014/0336042 A1   Nov. 13, 2014

(30) Foreign Application Priority Data
Dec. 26, 2011   (JP) .................................. 2011-283451

(51) Int. Cl.
*B01J 27/14* (2006.01)
*B01J 27/16* (2006.01)
(Continued)

(52) U.S. Cl.
CPC ............. *B01J 27/1856* (2013.01); *B01J 37/03* (2013.01); *B01J 37/08* (2013.01); *B01J 27/185* (2013.01);
(Continued)

(58) Field of Classification Search
USPC ............................. 502/213; 423/213.5, 239.1
See application file for complete search history.

(56) References Cited

U.S. PATENT DOCUMENTS

| | | | | |
|---|---|---|---|---|
| 5,260,241 A | * | 11/1993 | Addiego et al. | 502/60 |
| 5,736,114 A | * | 4/1998 | Barthe et al. | 423/213.2 |
| 2014/0221198 A1 | * | 8/2014 | Nagao et al. | 502/213 |

FOREIGN PATENT DOCUMENTS

| | | | | |
|---|---|---|---|---|
| JP | 4 334526 | | 11/1992 | |
| JP | 07-068178 | * | 3/1995 | B01J 27/18 |

(Continued)

OTHER PUBLICATIONS

Ikeue, K. et al., "Thermostable Rh Catalysts Supported on Metal Phosphates: Effect of Aging on Catalytic Activity for NO—CO—$C_3H_6$—$O_2$ Reactions", 'Bull Chem. Soc. JPN, vol. 83, No. 3, pp. 291-297, (2010).

(Continued)

*Primary Examiner* — Patricia L Hailey
(74) *Attorney, Agent, or Firm* — Oblon, McClelland, Maier & Neustadt, L.L.P.

(57) ABSTRACT

An exhaust gas purifying catalyst, which is obtained by having at least one platinum group metal selected from the group consisting of Pt, Rh, and Pd supported on a calcined aluminum phosphate body. The calcined aluminum phosphate body has a tridymite crystal structure and the ratio of the cumulative pore distribution of pores having a size of 10 nm or less to the cumulative pore distribution of pores having a size of 300 nm or less is 20% or more in the calcined aluminum phosphate body. A method for producing an exhaust gas purifying catalyst including calcining aluminum phosphate, which has been obtained from an aqueous solution that is controlled to have a pH within a predetermined range, at a predetermined temperature for a predetermined period of time, thereby obtaining a calcined aluminum phosphate body; and having at least one platinum group metal selected from the group consisting of Pt, Rh, and Pd supported on the calcined aluminum phosphate body.

10 Claims, 1 Drawing Sheet

(51) Int. Cl.
  *B01J 27/18* (2006.01)
  *B01J 37/00* (2006.01)
  *B01D 53/56* (2006.01)
  *B01D 53/86* (2006.01)
  *B01D 53/94* (2006.01)
  *B01J 27/185* (2006.01)
  *B01J 37/03* (2006.01)
  *B01J 37/08* (2006.01)
  *B01J 32/00* (2006.01)
  *B01J 35/10* (2006.01)
  *B01J 23/42* (2006.01)
  *B01J 23/44* (2006.01)
  *B01J 23/46* (2006.01)

(52) U.S. Cl.
  CPC *B01J 32/00* (2013.01); *B01J 35/10* (2013.01); *B01D 53/945* (2013.01); *B01D 2255/1021* (2013.01); *B01D 2255/1023* (2013.01); *B01D 2255/1025* (2013.01); *B01D 2255/2092* (2013.01); *Y02T 10/22* (2013.01); *B01J 23/42* (2013.01); *B01J 23/44* (2013.01); *B01J 23/464* (2013.01); *B01J 27/16* (2013.01); *B01J 35/1061* (2013.01); *B01J 35/1066* (2013.01); *B01J 35/109* (2013.01)

(56) References Cited

FOREIGN PATENT DOCUMENTS

| WO | 2009 142180 | 11/2009 | | |
|---|---|---|---|---|
| WO | WO 2009142180 A1 | * | 11/2009 | ............ B01D 53/94 |
| WO | 2013/099706 | * | 7/2013 | ............ B01J 27/185 |

OTHER PUBLICATIONS

International search Report Issued Apr. 9, 2013, in PCT/ JP12/ 082816 Filed Dec. 18, 2012.
Masato Machida, et al., "AlPO$_4$ as a Support Capable of Minimizing Threshold Loading of Rh in Automotive Catalysts", Chemistry of Materials, vol. 21, No. 9, May 12, 2009, pp. 1796-1798.

* cited by examiner

EXHAUST GAS PURIFYING CATALYST AND METHOD FOR PRODUCING SAME

TECHNICAL FIELD

The present invention relates to an exhaust gas purification catalyst and a method for producing it, and particularly it relates to a platinum-group metal-supporting aluminum phosphate catalyst for exhaust gas purification, such as a platinum-group metal-supporting aluminum phosphate catalyst that purifies noxious components in exhaust gas emitted from internal combustion engines of automobiles and the like, and to a method for producing it.

BACKGROUND ART

In recent years, worldwide restrictions on exhaust gas are becoming tighter from the viewpoint of environmental protection.

Exhaust gas purification catalysts are being employed in internal combustion engines as one measure. In order to efficiently purify the hydrocarbons (hereunder abbreviated as "HC"), CO and nitrogen oxides in exhaust gas, exhaust gas purification catalysts employ a variety of catalysts, including platinum-group elements such as Pt, Pd and Rh, as catalyst components.

PTL 1 describes a method in which nitrogen oxides in exhaust gas are removed by contacting nitrogen oxide-containing exhaust gas with a catalyst containing platinum in the presence of hydrocarbons, in an oxidizing atmosphere (claim 1 of PTL 1).

PTL 2 describes an exhaust gas purification catalyst comprising a heat-resistant $AlPO_4$ compound having a tridymite-type crystal structure and a BET specific surface area of 50-150 $m^2/g$, and at least one type of precious metal component selected from the group consisting of Pt, Pd and Rh, supported on the $AlPO_4$ compound (claim 1 of PTL 2).

CITATION LIST

Patent Literature

[PTL 1] Japanese Unexamined Patent Publication HEI No. 4-334526
[PTL 2] Japanese Patent Publication No. 4,505,046

DISCLOSURE OF THE INVENTION

Problems to be Solved by the Invention

There is a demand for an exhaust gas purification catalyst that is resistant to deterioration by heat emitted from engines and by the sulfur components contained in fuels. For greater suitability for exhaust gas purification standard, it is necessary to use an exhaust gas purification apparatus that can also satisfactorily remove such components even under conditions with low exhaust gas temperature, such as during engine start-up or low-speed operation.

Also, while aluminum phosphate can serve as a catalyst support with excellent heat resistance and sulfur toxicity resistance, there has been a demand for catalysts employing aluminum phosphate exhibiting more excellent satisfactory high catalytic activity at low temperatures.

Means for Solving the Problems

As a result of diligent efforts, the present inventors have found that it is possible to solve the problem described above by spreading the pore distribution of fired aluminum phosphate with a tridymite-type crystal structure more toward the small pore diameter end.

The embodiments of the present invention are as follows.

(1) An exhaust gas purification catalyst having at least one type of platinum-group metal selected from the group consisting of Pt, Rh and Pd supported on a fired aluminum phosphate body,
wherein the fired aluminum phosphate body has a tridymite-type crystal structure, and the cumulative pore distribution of pores of sizes 10 nm and smaller with respect to the cumulative pore distribution of pores of sizes 300 nm and smaller in the fired aluminum phosphate body is at least about 20%.

(2) An exhaust gas purification catalyst according to (1), wherein the platinum-group metal is Pd.

(3) A method for producing an exhaust gas purification catalyst, comprising the steps of:
firing aluminum phosphate obtained from an aqueous solution prepared to a pH of 3.5 to 4.5, at a temperature of between about 1000° C. and about 1200° C. for about 2 hours or longer, to obtain a fired aluminum phosphate body, and
supporting at least one type of platinum-group metal selected from the group consisting of Pt, Rh and Pd on the fired aluminum phosphate body.

(4) The method for producing an exhaust gas purification catalyst according to (3), wherein the platinum-group metal is Pd.

Effect of the Invention

The exhaust gas purification catalyst of the invention exhibits the excellent performance of a fired aluminum phosphate body including heat resistance and toxicity resistance against sulfur and the like, while it can also exhibit much more excellent catalytic activity at low temperatures compared to conventional aluminum phosphate catalysts and even compared to conventional aluminum phosphate catalysts with tridymite-type crystal structures.

BEST MODE FOR CARRYING OUT THE INVENTION

Throughout the present specification, references using names of the inorganic material compounds or ratios of metals present (instances provided below), even if they are produced so as to have these compositions, include compositions that when actually produced contain impurities and the like. Thus, a reference using the name of an inorganic material compound or ratio of metals present include inorganic compounds having in the structure of the inorganic compound a composition with an excess or deficiency of ±1 or less atoms of elements such as oxygen, hydrogen and nitrogen in the chemical formula; or in the case of aluminum phosphate, for example, $AlPO_4$ includes compounds $AlPO_2$ to $AlPO_5$ having ±1 oxygen atoms, and compounds having an Al/P ratio of 1± about 0.3, as well as those having hydrogen as an impurity, which are not represented by the compound formula.

Throughout the present specification, the diameter or pore size means the diameter of the pore, which is the diameter corresponding to a circular pore with the same area, if the pore is non-circular.

The cumulative pore distribution is the integral of $dV/d\log_{10}(D)$ for pores with diameters greater than zero and up to the prescribed diameter (where V is the pore volume and D is the pore diameter), and throughout the present specification, it is normalized so that the integral of $dV/d\log_{10}(D)$ for pores of greater than zero to 300 nm is 100%, i.e. 1.

The fired aluminum phosphate body of the invention has a tridymite-type crystal structure. However, this may include berlinite-type crystal structures, cristobalite-type crystal structures or amorphous forms, in addition to a tridymite-type crystal structure.

The fired aluminum phosphate body of the invention is not particularly restricted so long as the ratio of the cumulative pore distribution of 10 nm and smaller with respect to the cumulative pore distribution of 300 nm and smaller is satisfied, as explained below, and for example, it may have a BET specific surface area of about 10 $m^2/g$ or greater, about 30 $m^2/g$ or greater, about 40 $m^2/g$ or greater, about 50 $m^2/g$ or greater or about 60 $m^2/g$ or greater, and about 400 $m^2/g$ or smaller, about 300 $m^2/g$ or smaller, about 200 $m^2/g$ or smaller or about 150 $m^2/g$ or smaller.

Figure 1:
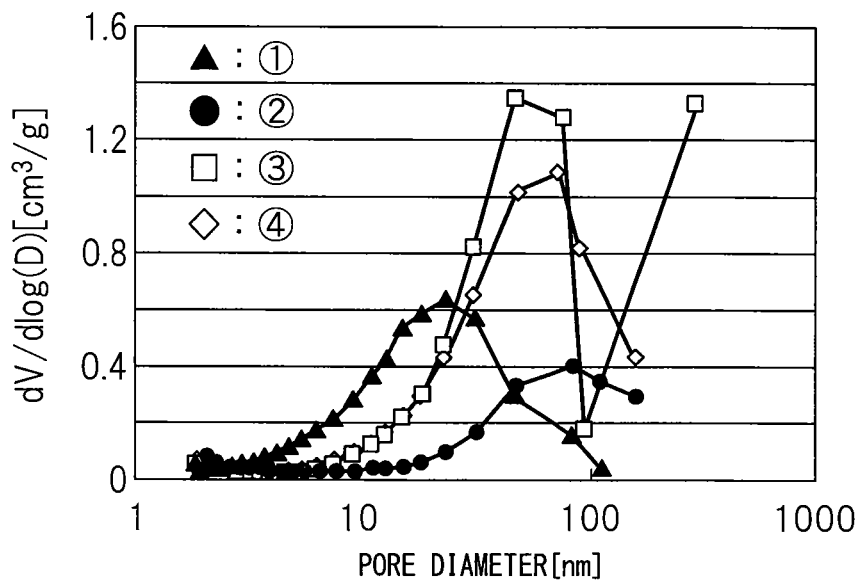
FIG. 1 is a graph plotting pore distribution (dV/d $\log_{10}(D)$ ($cm^3/g$) with respect to pore size in fired aluminum phosphate bodies, for the samples of Examples 1 and 2 and Comparative Examples 1 and 2 produced under each condition.

The pores in the fired aluminum phosphate body have a distribution of pore sizes in a width as shown in FIG. 1, for example. Also, the distribution of pore sizes in the fired aluminum phosphate body of the invention is a distribution of thickness for the small diameter region.

In addition, the fired aluminum phosphate body of the invention has a ratio for the cumulative pore distribution of about 10 nm and smaller, for example, that is about 20% or greater with respect to the cumulative pore distribution of about 300 nm and smaller.

Figure 2:
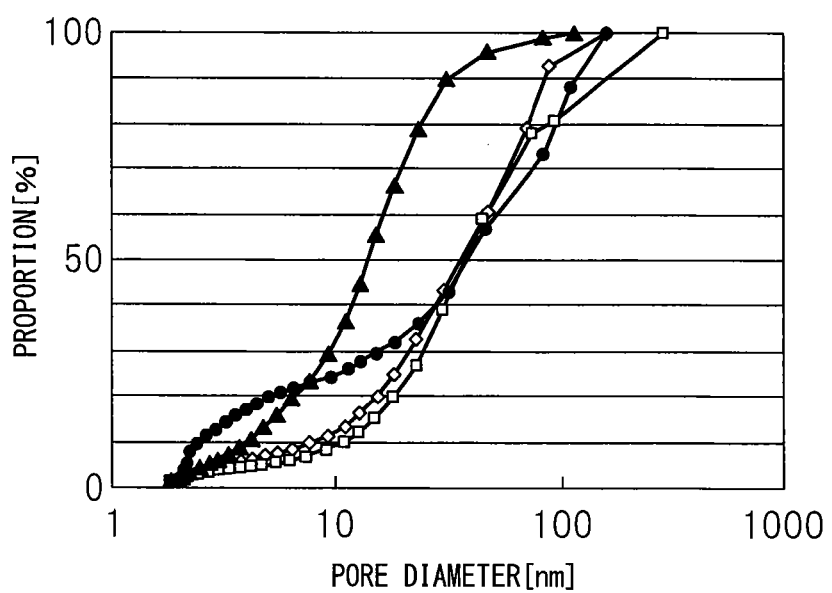
FIG. 2 is a graph showing cumulative distributions of pores with sizes of 300 nm and smaller, plotting (cumulative pore distribution up to prescribed pore size on the abscissa)/(cumulative pore distribution of ≤/300 nm)×100(%) for a prescribed pore size, in fired aluminum phosphate bodies, for the samples of Examples 1 and 2 and Comparative Examples 1 and 2 produced under different conditions.

As can be read from the graph in FIG. 2, the ratio of the cumulative pore distribution of X nm and smaller with respect to the cumulative pore distribution of about 300 nm and smaller, i.e. (cumulative pore distribution of X nm and smaller)/(cumulative pore distribution of about 300 nm and smaller)×100(%), can be approximately 20% or greater or approximately 25% or greater when X is about 10. The variable X used here can also be defined as, for example, about 5 nm, about 15 nm or about 20 nm instead of about 10 nm, as can also be read from the graph in FIG. 2.

While it is not our desire to be constrained by theory, it is possible that the catalyst of the invention exhibits excellent performance because of the state of the platinum-group metal in the pores. In the case of Pd, for example, since Pd generally has low heat resistance and readily aggregates, it suffers notable reduction in catalytic power due to heat degradation. When Pd is present in pores, however, the Pd nanoparticles become firmly bonded both physically and chemically in the pores, and they may therefore be considered resistant to movement or aggregation compared to Pd nanoparticle present outside pores or present in pores with larger diameters, even when the catalyst is heated. Also, Pd supported in a fired aluminum phosphate body containing many small pores with sizes of 10 nm or smaller has a higher probability of being present in those pores, and may be considered resistant to aggregation.

Thus, while it is not our desire to be constrained by any particular theory, it is possible that for this reason the exhaust gas catalyst of the invention can maintain satisfactory catalytic activity even after aging treatment, compared to a conventional Pd-supporting $AlPO_4$ catalyst.

There are no particular restrictions on the method for producing the catalyst of the invention so long as it is a method that can increase the distribution of pore sizes of the fired aluminum phosphate body toward the fine pore size end compared to a conventional fired aluminum phosphate body having a tridymite-type crystal structure, and for example, a wide range of methods may be employed, such as:

(a) a method in which aluminum phosphate obtained from an aluminum phosphate aqueous solution with a prescribed pH is fired for a prescribed period of time at a prescribed temperature, (b) a method in which during production of a fired aluminum phosphate body, an excess of phosphorate ion is added with respect to the aluminum ion, to produce residue of the unreacted phosphorate ion in the product, or (c) a method in which a foaming agent such as a thermoplastic resin such as an olefin-based resin or a thermoplastic resin such as a phenol-based resin, having a diameter that can produce the prescribed pore sizes, is mixed with the starting material for production of the fired aluminum phosphate body, and the foaming agent is burned off in the firing step.

The pH of the aqueous solution during production of the aluminum phosphate in (a) above may be about 3.0 or higher, about 3.2 or higher, about 3.5 or higher, about 3.7 or higher or about 4.0 or higher, and about 8.0 or lower, about 7.5 or lower, about 6.0 or lower, about 6.5 or lower, about 6.0 or lower, about 5.5 or lower, about 5.0 or lower, about 4.5 or lower, about 4.4 or lower, about 4.3 or lower or about 4.2 or lower. In order to obtain a satisfactory tridymite-type crystal structure, it is preferred for the pH of the aluminum phosphate aqueous solution during production of aluminum phosphate to be about 3.5 or higher and about 4.5 or lower.

The firing temperature in (a) may be a temperature of about 1000° C. or higher, about 1010° C. or higher, about 1020° C. or higher, about 1050 or higher or about 1100° C. or higher, and about 1500° C. or lower, about 1400° C. or lower, about 1300° C. or lower or about 1200° C. or lower, and the firing time for (a) may be about 1 hour or longer, about 2 hours or longer, about 3 hours or longer, about 4 hours or longer, about 5 hours or longer or about 6 hours or longer, and about 20 hours or shorter, about 15 hours or shorter, about 13 hours or shorter, about 10 hours or shorter or about 9 hours or shorter.

There are no particular restrictions on the method for producing the fired aluminum phosphate body, and any known method, such as neutralization, may be employed. For example, there may be mentioned a method of adding an aqueous solution of phosphoric acid to an aqueous solution of an Al-containing compound so that the molar ratio of P with respect to Al is essentially equal, adding ammonia water to adjust the pH, and separating and drying the resultant precipitate and subsequently firing it at the aforementioned firing temperature. Examples for the Al-containing compound include metal salts such as hydroxides and nitrates, and specifically $Al(OH)_3$ and $Al(NO_3)_3$.

The solvent used for the mixed solution containing the aluminum salt and phosphoric acid may be any desired solvent that is capable of dissolving the aluminum-containing compound and phosphoric acid, and for example, an aqueous solvent such as water or an organic solvent may be used.

The purification catalyst of the invention has at least one type of platinum-group metal selected from the group consisting of Pt, Rh and Pd further supported on the fired aluminum phosphate body. The embodiment of support is not particularly restricted, and it is sufficient if the platinum-group metal is supported thereon in a generally uniform manner.

The particle sizes of the platinum-group metal nanoparticles to be supported are not particularly restricted, and for example, they may be about 0.5 nm or larger, about 1 nm or larger, about 2 nm or larger, about 3 nm or larger or about 4 nm or larger, and about 10 nm or smaller, about 9 nm or smaller, about 8 nm or smaller, about 7 nm or smaller or about 6 nm or smaller.

The amount of platinum-group metal with respect to the fired aluminum phosphate body may be about 0.01 wt % or greater, about 0.1 wt % or greater, about 0.5 wt % or greater or about 1 wt % or greater, and about 10 wt % or less, about 5 wt % or less or about 4 wt % or less.

The method of supporting the platinum-group metal nanoparticles on the fired aluminum phosphate body is not particularly restricted so long as it does not adversely affect the pore distribution of the fired aluminum phosphate body by creating a bias toward the large pore size end, and it may be a common method such as impregnation or surface deposition.

In order for the particle sizes of the platinum-group metal nanoparticles to be rendered uniform, a platinum-group metal colloid of about 1 nm, about 2 nm, about 3 nm or about 4 nm may be used, that can provide platinum-group metal particles of the desired particle size. There may also be used another platinum-group metal source, such as a platinum acetate-based metal compound, platinum nitrate-based metal compound or platinum chloride-based metal compound, or platinum-group metal nanoparticles synthesized from these. However, aluminum phosphate preferably does not contain nitrate ion or chloride ion because it is readily soluble in strong acids.

EXAMPLES

The invention will now be explained in more specific detail by examples, with the understanding that the invention is in no way limited to the examples.

Production Example 1

Aluminum nitrate nonahydrate (manufacturer: Wako Pure Chemical Industries, Ltd.) was dissolved in ion-exchanged water, and 85 wt % phosphoric acid was added to the aluminum aqueous solution. To this there was added dropwise 28 wt % ammonia water, to adjust the pH to between 3.5 and 4.5, and the mixture was stirred for 12 hours at room temperature. The solution at this point was opaque.

The opaque solution was separated into precipitate and supernatant using a centrifugal separator, and the precipitate was purified twice with ion-exchanged water. It was then dried at 120° C. for 12 hours. The dried product was shredded and fired at 1050° C. (Example 1) or 1100° C. (Example 2) for 5 hours. After standing to cool, the fired product was shredded to obtain powder of a fired aluminum phosphate body.

Support of the Pd nanoparticles, on the other hand, was accomplished by an impregnation method. The Pd source used was PVP (polyvinylpyrrolidone)-protected Pd colloid (Pd particle size: 2 nm). The loading weight of the Pd nanoparticles was 0.5 wt % with respect to the support. The fired aluminum phosphate body powder was dispersed in ion-exchanged water and the Pd nanoparticle colloid was added thereto. The temperature was increased to 120° C. to 150° C. while stirring to evaporate the solvent. The obtained dry product was shredded and fired at 500° C. for 2 hours. After standing to cool, the fired product was shredded to obtain a catalyst powder.

Reference Production Example 1

In 1000 ml of water there were dissolved 0.5 mol of aluminum nitrate nonahydrate (manufacturer: Wako Pure Chemical Industries, Ltd.) and 0.7 mol of phosphoric acid. To this solution there was slowly added dropwise 10 wt % ammonia water while stirring, to pH 4.5. The produced white precipitate was rinsed with water using a centrifugal separator and dried at 100° C. for 24 hours. The obtained sample was placed in an alumina crucible, the cover was closed, and a muffle furnace was used for firing in air at 1000° C. for 5 hours, to obtain powder of a fired aluminum phosphate body.

The powder of the obtained fired body was heat treated at 1000° C. for 5 hours, upon which the BET specific surface area was 102 m$^2$/g and the Al/P average value was 1.01.

The method of supporting Pd nanoparticles in Production Example 1 above was followed to obtain powder of a 0.5 wt % Pd-supporting AlPO$_4$ catalyst, as a sample for Comparative Example 1.

Reference Production Example 2

The method of Production Example 1 was used, except that the aluminum phosphate firing temperature was 500° C., to obtain powder of a 0.5 wt % Pd-supporting AlPO$_4$ catalyst, as a sample for Comparative Example 2.

(Pore Distribution Measurement Method)

A specific surface area/pore distribution measuring apparatus (manufacturer: Micrometrics, Model No. ASAP2010) was used for gas adsorption based on the constant volume method, pretreating 0.15 g of sample powder at 350° C., ≤10 mmHg, followed by measurement of the liquid N$_2$ temperature (−196° C.) using N$_2$ gas. The adsorption/desorption isotherm was then determined, and the log differential pore volume distribution dV/d(log$_{10}$D) was calculated.

(Catalyst Evaluation Method)

After adding catalyst powder at 2 t pressure, it was pulverized and the obtained granules with diameters of about 3 mm were used as an evaluation sample. This was placed in a rich/lean switchable gas flow constant temperature furnace and subjected to heat treatment at 1000° C. for 5 hours while periodically changing the gas atmosphere (aging treatment).

A gas flow catalyst evaluator was used for measurement of the gas purification performance. The catalyst amount was 3 g. The model gas used was a model gas comprising CO: 0.65%, $C_3H_6$: 3000 ppmC, NO: 1500 ppm, $O_2$: 0.7%, $H_2O$: 3%, $CO_2$: 10%, $N_2$: remainder, with the flow rate set to 15 liter/min. The SV was approximately 200,000 hours$^{-1}$. The gas composition after passing through the catalyst was measured using an infrared spectrometer (manufacturer: Horiba, Ltd., Model No. MEXA-6000FT).

(Results)

When the fired aluminum phosphate body powders obtained in Examples 1 and 2 and Comparative Example 1 were measured with an X-ray diffractometer (manufacturer: Rigaku Corp., Model No. RINT), production of fired aluminum phosphate bodies each having a tridymite-type crystal structure was confirmed.

The material properties of the obtained fired aluminum phosphate bodies are shown in Table 1, and the performance of catalysts with Pd supported thereon are shown in Table 2.

The specific surface area was measured by the BET method.

TABLE 1

Material properties of each AlPO₄ fired body

| No. | Contained crystal structure | Proportion of pores of 10 nm or less (%) | Specific surface area ($m^2/g$) |
|---|---|---|---|
| Example 1 | Tridymite | 29 | 102 |
| Example 2 | Tridymite | 24 | 52 |
| Comp. Ex. 1 | Tridymite | 8 | 106 |
| Comp. Ex. 2 | None (amorphous) | 11 | 107 |

TABLE 2

Three-element activity evaluation results for different
Pd-supporting AlPO₄ catalysts
Catalyst: Pd supported at 0.5 wt % with respect to AlPO₄

| | | 50% Purification temperature/° C. | | |
|---|---|---|---|---|
| No. | Crystal structure | CO | HC | NO |
| Example 1 | Tridymite | 363 | 352 | 398 |
| Example 2 | Tridymite | 419 | 401 | 465 |
| Comp. Ex. 1 | Tridymite | 433 | 414 | 483 |
| Comp. Ex. 2 | None (amorphous) | 447 | 422 | 513 |

A tridymite crystal phase was exhibited when aluminum phosphate was subjected to firing at 1000° C. or higher, and the catalysts with Pd supported on this (Examples 1 and 2, Comparative Example 1) exhibited high activity compared to the catalyst with Pd supported on an amorphous fired aluminum phosphate body (Comparative Example 2).

However, comparison between the catalysts with the same tridymite crystal structure (Examples 1 and 2, Comparative Example 1) indicated that the samples of Examples 1 and 2 had even more excellent catalyst performance than the sample of Comparative Example 2 (Table 2).

This indicated that the Pd-supporting AlPO₄ catalysts according to emgodiments of the invention (Example 1, Example 2) can support satisfactory catalytic activity even after aging treatment, compared to the conventional Pd-supporting AlPO₄ catalysts (Comparative Examples 1 and 2). It was also demonstrated that the pore distribution has a greater influence on the difference in performance between the catalysts according to embodiments of the invention and the prior art catalysts, than the specific surface area of the fired aluminum phosphate body (Table 1) (FIGS. 1 and 2).

INDUSTRIAL APPLICABILITY

As explained above, the exhaust gas purification catalyst of the invention has satisfactory performance as a three-element catalyst even under low humidity conditions. The uses of an oxidation catalyst according to the invention, therefore, are not limited to an exhaust gas purification catalyst, and it may be utilized for various purposes in a wide range of fields.

What is claimed is:

1. An exhaust gas purification catalyst having a platinum-group metal which is Pd supported on a fired aluminum phosphate body,
    wherein the fired aluminum phosphate body has a tridymite-type crystal structure, and the cumulative pore distribution of pores of sizes 10 nm and smaller with respect to the cumulative pore distribution of pores of sizes 300 nm and smaller in the fired aluminum phosphate body is at least 20%.

2. The catalyst according to claim 1, wherein the fired aluminum phosphate body has a BET specific surface area of from 10 $m^2/g$ to 400 $m^2/g$.

3. The catalyst according to claim 1, wherein the fired aluminum phosphate body has a BET specific surface area of from 30 $m^2/g$ to 300 $m^2/g$.

4. The catalyst according to claim 1, wherein the fired aluminum phosphate body has a BET specific surface area of from 40 $m^2/g$ to 200 $m^2/g$.

5. The catalyst according to claim 1, wherein the cumulative pore distribution of pores of sizes 10 nm and smaller with respect to the cumulative pore distribution of pores of sizes 300 nm and smaller in the fired aluminum phosphate body is at least 25%.

6. A method for producing an exhaust gas purification catalyst according to claim 1, comprising the steps of:
    firing aluminum phosphate obtained from an aqueous solution prepared to a pH from 3.5 to less than 4.5, at a temperature of between 1000° C. and 1200° C. for 2 hours or longer, to obtain a fired aluminum phosphate body, and
    supporting a platinum-group metal which is Pd on the fired aluminum phosphate body.

7. The method according to claim 2, wherein the pH of the aqueous solution is from 3.7 to less than 4.4.

8. The method according to claim 2, wherein the temperature during the firing is between 1100° C. and 1200° C. for 2 to 20 hours.

9. The method according to claim 2, wherein the platinum-group metal comprises nanoparticles having a particle size ranging from 0.5 nm to 10 nm.

10. The method according to claim 2, wherein an amount of the platinum-group metal with respect to the fired aluminum phosphate body is from 0.01 wt % to 10 wt %.

* * * * *